(12) United States Patent
Fitzsimmons

(10) Patent No.: US 8,939,278 B2
(45) Date of Patent: Jan. 27, 2015

(54) DECONSOLIDATION DEVICE FOR PARTICULATE MATERIAL EXTRUSION PUMP

(75) Inventor: Mark Andrew Fitzsimmons, Reseda, CA (US)

(73) Assignee: Aerojet Rocketdyne of DE, Inc., Canoga Park, CA (US)

( * ) Notice: Subject to any disclaimer, the term of this patent is extended or adjusted under 35 U.S.C. 154(b) by 1078 days.

(21) Appl. No.: 12/758,846

(22) Filed: Apr. 13, 2010

(65) Prior Publication Data

US 2011/0247916 A1 Oct. 13, 2011

(51) Int. Cl.
*B65G 15/00* (2006.01)
*F27D 3/18* (2006.01)
*F23G 5/44* (2006.01)

(52) U.S. Cl.
CPC .............. *F27D 3/18* (2013.01); *B65G 2201/02* (2013.01); *F23G 5/444* (2013.01)
USPC ..................................... 198/626.1

(58) Field of Classification Search
USPC ........... 198/525, 626.1–626.6, 640, 641, 642, 198/638; 406/195; 193/2 R
See application file for complete search history.

(56) References Cited

U.S. PATENT DOCUMENTS

| | | | |
|---|---|---|---|
| 1,947,011 A * | 2/1934 | Karthauser | 193/2 R |
| 2,713,408 A * | 7/1955 | Tench | 193/32 |
| 2,742,185 A * | 4/1956 | Landry | 222/1 |
| 3,039,145 A * | 6/1962 | Langecker | 222/409 |
| 3,856,658 A | 12/1974 | Wolk et al. | |
| 3,950,147 A | 4/1976 | Funk et al. | |
| 4,191,500 A | 3/1980 | Oberg et al. | |
| 4,197,092 A | 4/1980 | Bretz | |
| 4,206,610 A | 6/1980 | Santhanam | |
| 4,206,713 A | 6/1980 | Ryason | |
| 4,218,222 A | 8/1980 | Nolan, Jr. et al. | |
| 4,356,078 A | 10/1982 | Heavin et al. | |
| 4,377,356 A | 3/1983 | Santhanam | |
| 4,391,561 A | 7/1983 | Smith et al. | |
| 4,433,947 A | 2/1984 | Kratzer et al. | |
| 4,488,838 A | 12/1984 | Herud | |
| 4,516,674 A * | 5/1985 | Firth | 198/617 |
| 4,605,352 A | 8/1986 | Scott et al. | |
| 4,721,420 A | 1/1988 | Santhanam et al. | |
| 4,765,781 A | 8/1988 | Wilks et al. | |
| 4,963,065 A | 10/1990 | Scott et al. | |
| 4,988,239 A | 1/1991 | Firth | |
| 5,051,041 A | 9/1991 | Firth | |

(Continued)

FOREIGN PATENT DOCUMENTS

EP 1900941 3/2008
GB 2002025 2/1979

(Continued)

OTHER PUBLICATIONS

European Search Report dated Aug. 9, 2011. EP App. No./Patent No. 11250450.1215.

(Continued)

*Primary Examiner* — William R Harp
(74) *Attorney, Agent, or Firm* — Joel G Landau

(57) ABSTRACT

A deconsolidation device defines a flow path with an inlet which defines a first cross-section generally equivalent to a passageway cross-section of a particulate material extrusion pump and an outlet that defines a second cross-section different than the first cross-section.

12 Claims, 8 Drawing Sheets

(56) References Cited

U.S. PATENT DOCUMENTS

| | | |
|---|---|---|
| 5,186,111 A | 2/1993 | Baria |
| 5,223,199 A * | 6/1993 | Ponzielli ............... 264/114 |
| 5,273,556 A | 12/1993 | McMahon et al. |
| 5,325,603 A * | 7/1994 | Eastham et al. ............. 34/371 |
| 5,356,280 A * | 10/1994 | Ponzielli ............... 425/201 |
| 5,402,876 A | 4/1995 | Hay |
| 5,485,909 A | 1/1996 | Hay |
| 5,497,873 A | 3/1996 | Hay |
| 5,533,650 A | 7/1996 | Conrad et al. |
| 5,551,553 A | 9/1996 | Hay |
| 5,558,473 A | 9/1996 | Lindahl |
| 6,152,668 A | 11/2000 | Knoch |
| 6,213,289 B1 | 4/2001 | Hay et al. |
| 6,220,790 B1 | 4/2001 | Schenk et al. |
| 6,749,816 B1 | 6/2004 | Hasegawa et al. |
| 7,303,597 B2 | 12/2007 | Sprouse et al. |
| 7,387,197 B2 | 6/2008 | Sprouse et al. |
| 7,402,188 B2 | 7/2008 | Sprouse |
| 7,615,198 B2 | 11/2009 | Sprouse et al. |
| 8,006,827 B2 * | 8/2011 | Aldred et al. ............ 198/638 |
| 2006/0243583 A1 | 11/2006 | Sprouse et al. |
| 2010/0021247 A1 | 1/2010 | Aldred et al. |

FOREIGN PATENT DOCUMENTS

| | | |
|---|---|---|
| JP | 315030 | 6/1931 |
| JP | 54108360 | 8/1979 |
| JP | 1116749 | 8/1989 |
| JP | 3195811 | 8/1991 |
| JP | 6042822 | 2/1994 |
| JP | 6287567 | 10/1994 |
| JP | 2004026483 | 1/2004 |
| JP | 2008069003 | 3/2008 |

OTHER PUBLICATIONS

China Search Report dated Nov. 27, 2012 CN Application No. 201110092293.7.

* cited by examiner

… (US 8,939,278 B2)

DECONSOLIDATION DEVICE FOR PARTICULATE MATERIAL EXTRUSION PUMP

BACKGROUND

The present disclosure relates to a deconsolidation device for a particulate material extrusion pump.

Coal gasification involves the conversion of coal or other carbon-containing solids into synthesis gas. While both dry coal and water slurry are used in the gasification process, dry coal pumping may be more thermally efficient than water slurry technology.

In order to streamline the process and increase the mechanical efficiency of dry coal gasification, a particulate material extrusion pump is utilized to pump pulverized carbon-based fuel such as dry coal. The pulverized carbon-based fuel downstream of the particulate material extrusion pump requires breaker mills, ball end mills or other pulverization machines to deconsolidate the dry coal.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
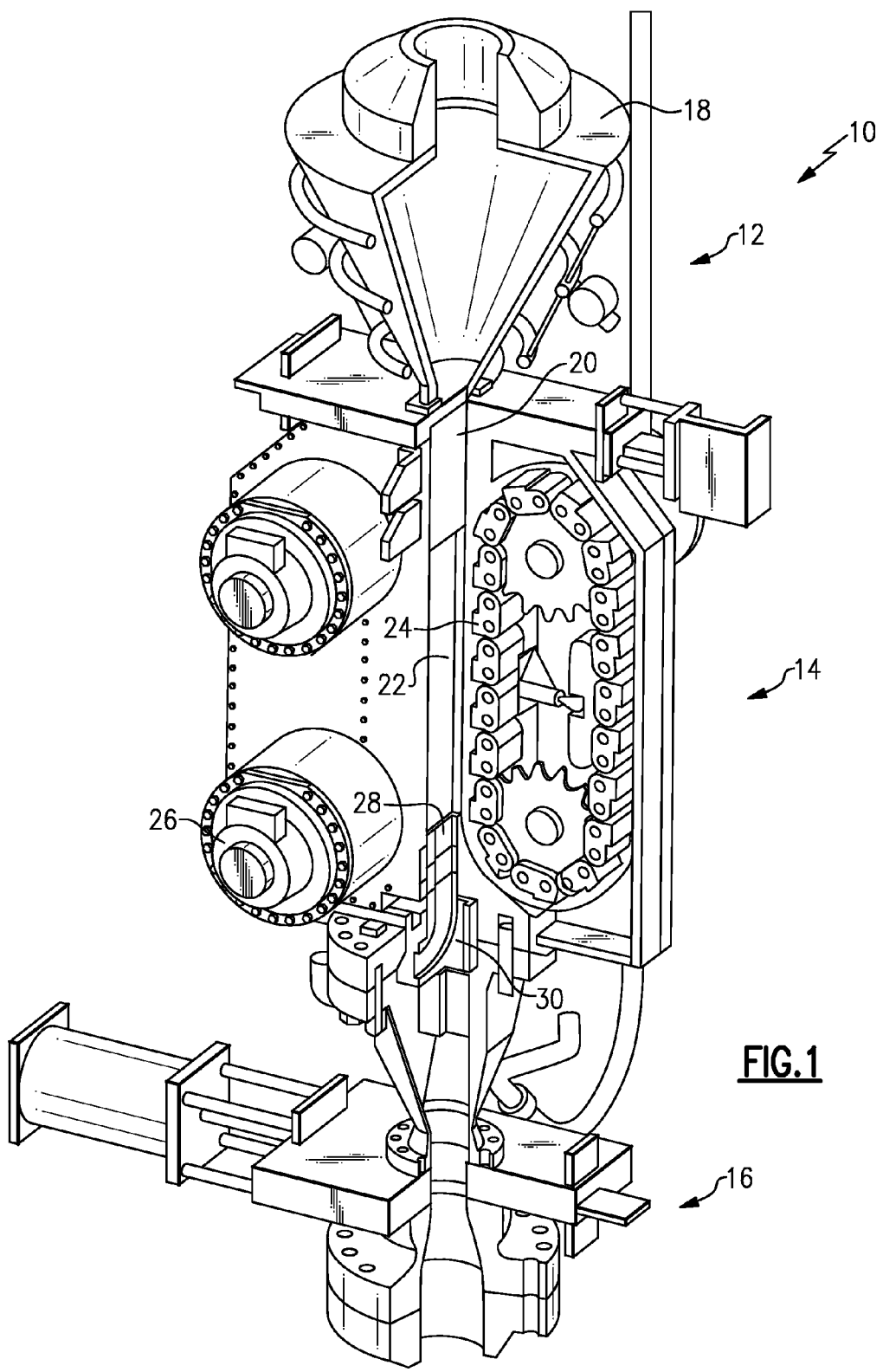
FIG. 1 is a perspective view of a dry coal extrusion pump.

FIG. 1 schematically illustrates a perspective view of a particulate material extrusion pump 10 for transportation of a dry particulate material. Although pump 10 is discussed as a transport for pulverized carbon-based fuel such as coal, biomass, petroleum coke, waste or other feedstock, the pump 10 may alternatively transport any dry particulate material and may be used in various other industries, including, but not limited to: coal gasification, petrochemical, electrical power, food, and agricultural.

The pump 10 generally includes an inlet zone 12, a compression work zone 14 and an outlet zone 16. The inlet zone 12 generally includes a hopper 18 and an inlet 20. The compression work zone 14 generally includes a passageway 22 defined by a moving wall 24 and drives system 26 therefor. The outlet zone 16 generally includes an outlet 28 and a deconsolidation device 30.

The deconsolidation device 30 deconsolidates the coal which may be consolidated within the passageway 22 by the moving wall 24. That is, the pulverized carbon-based fuel may be tightly compacted from the passageway 22. The pulverized carbon-based fuel has a natural angle of repose. That is, a natural angle forms between the horizontal at the top of a pile of unconsolidated material, and the sides. The consolidated pulverized carbon-based fuel has been compressed into a state where the particulate adhere to each other forming a mass which may stand vertically unsupported at angles higher than the natural angle of repose. Partially deconsolidated material may have a natural angle of repose but still consist of a mixture of unconsolidated and consolidated material that may be further reduced by shearing the largest particle masses against each other or the surfaces of a device.

Figure 2:
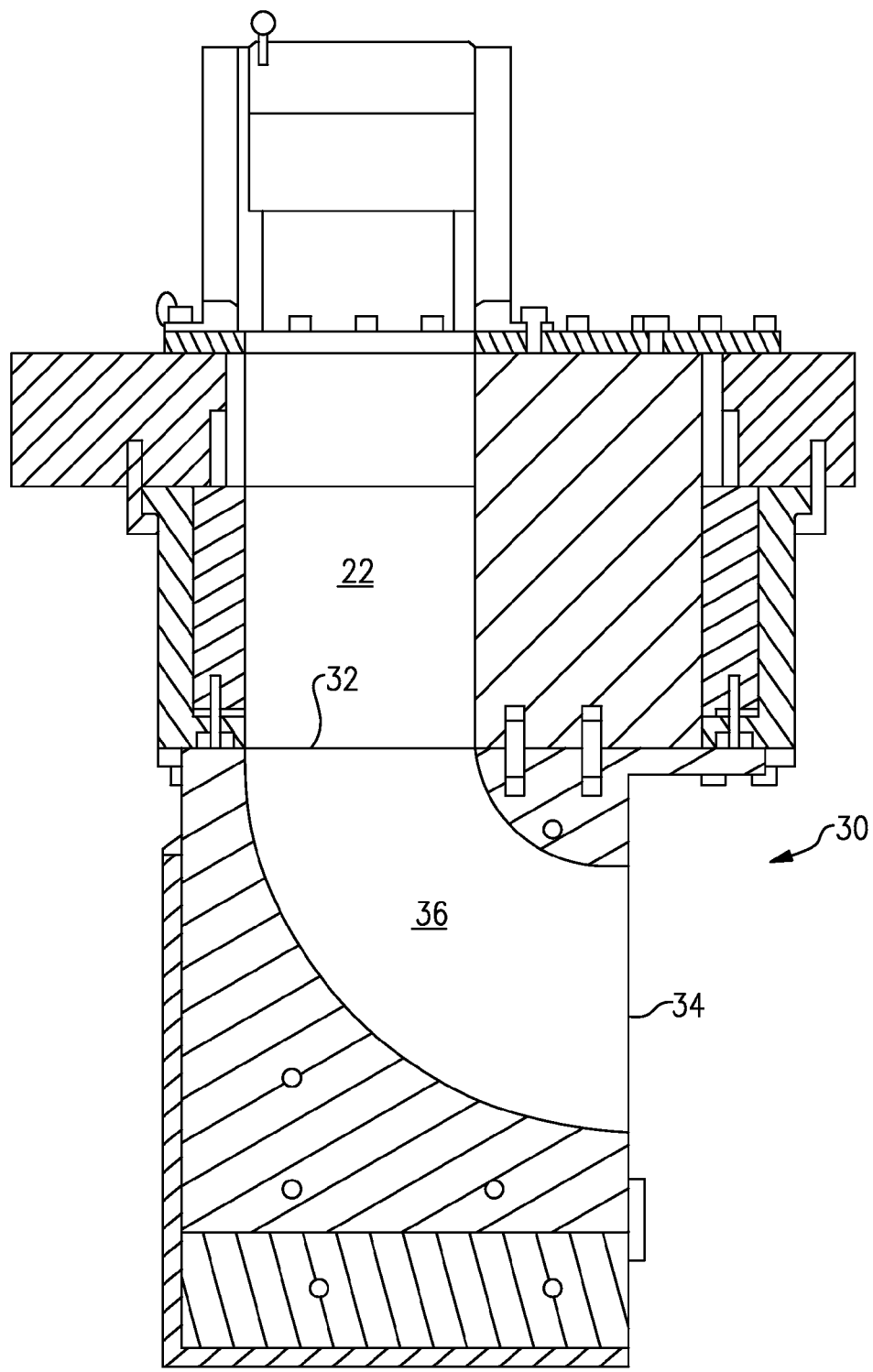
FIG. 2 is a sectional view of a deconsolidation device.

Referring to FIG. 2, the deconsolidation device 30 includes an inlet 32 which defines a first cross-section which is generally equivalent to the cross-section formed by the passageway 22 and an outlet 34 which defines a second cross-section different than the first cross-section to break the compressed pulverized consolidated particulate into a fine powder consistency. After being passed through the device once, the carbon based material is no longer prevented from lying at a natural angle of repose. The flow path 36 between the inlet 32 and the outlet 34 forces pulverized coal particles to move in relation to each other without re-compaction. A three dimensional shape change is provided by a flow path 36 between the inlet 32 and the outlet 34 of the deconsolidation device 30. The flow path 36 provides the requisite particle breakage as the pulverized carbon-based fuel is forced to change direction and allowed to expand in volume.

Figure 3:
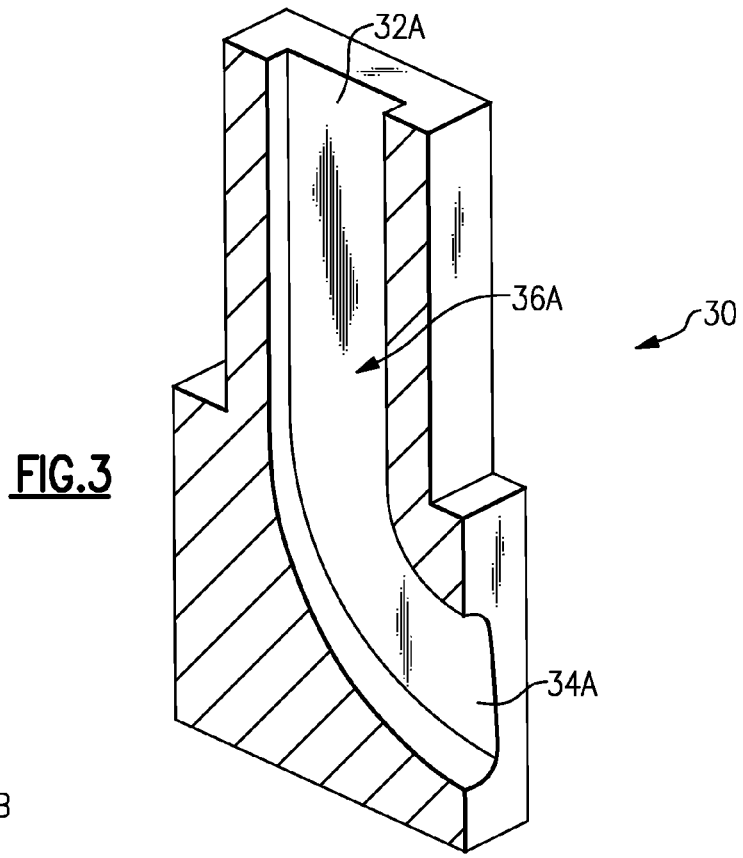
FIG. 3 is a sectional view of a one non-limiting embodiment of a deconsolidation device.

Referring to FIG. 3, one non-limiting embodiment of the flow path 36A of the deconsolidation device 30 provides a rectilinear inlet 32A as the first cross-section which is generally equivalent to the cross-section formed by the passageway 22, and an outlet 34A which defines the second cross-section which includes radiused corners. The flow path 36A also turns through an at least ninety (90) degree turning angle.

Figure 4:
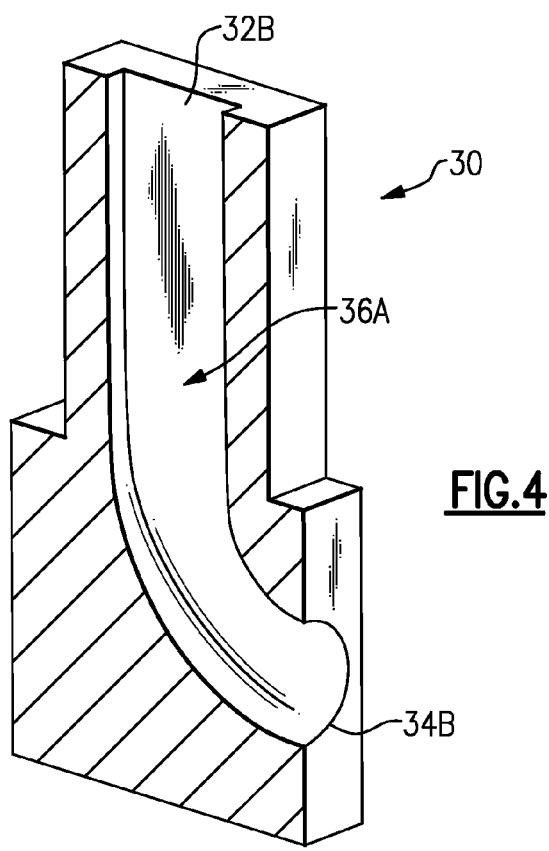
FIG. 4 is a sectional view of a another non-limiting embodiment of a deconsolidation device.

Referring to FIG. 4, another non-limiting embodiment of the flow path 36B of the coal deconsolidation device 30 provides a rectilinear inlet 32B as the first cross-section which is generally equivalent to the cross-section formed by the passageway 22, and an outlet 34B which defines the second cross-section which defines a round outlet. The flow path 36A also turns through an at least ninety (90) degree turning angle.

Figure 5:
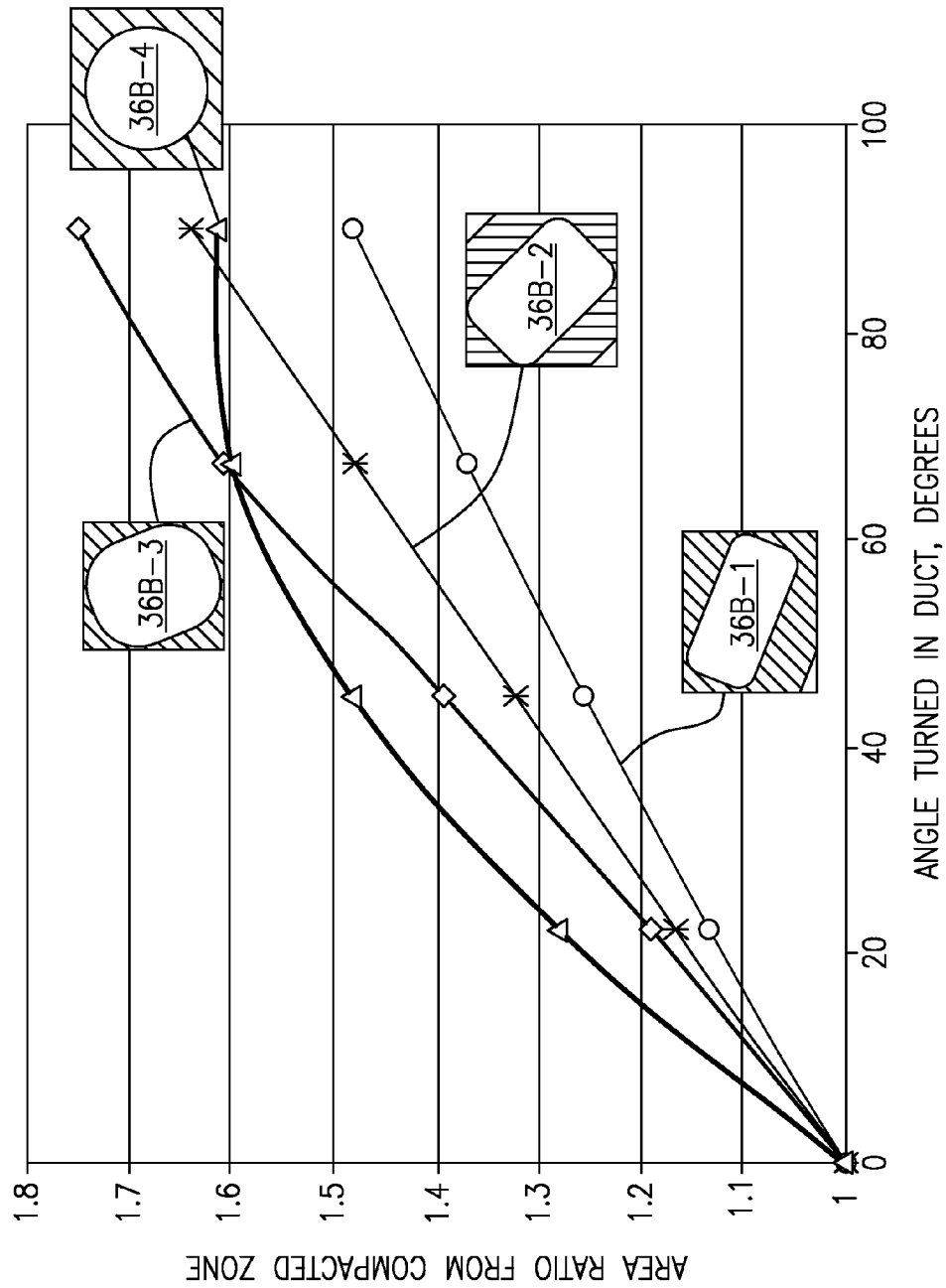
FIG. 5 is a graphical representation of various deconsolidation device flow path area ratio and angle relationship.

Referring to FIG. 5, various tradeoffs result from the relationship along the flow path 36. It should be understood that various combinations of area ratios along the flow path 36 may be utilized herewith. The transition from a rectilinear inlet to a round outlet results in an increase in area relatively slowly along the flow path 36B-1, 36B-2, 36B-3, 36B-4 while changing the shape relatively more quickly. A relatively simple angle is also effective yet total efficiency may be relatively less.

Figure 6:
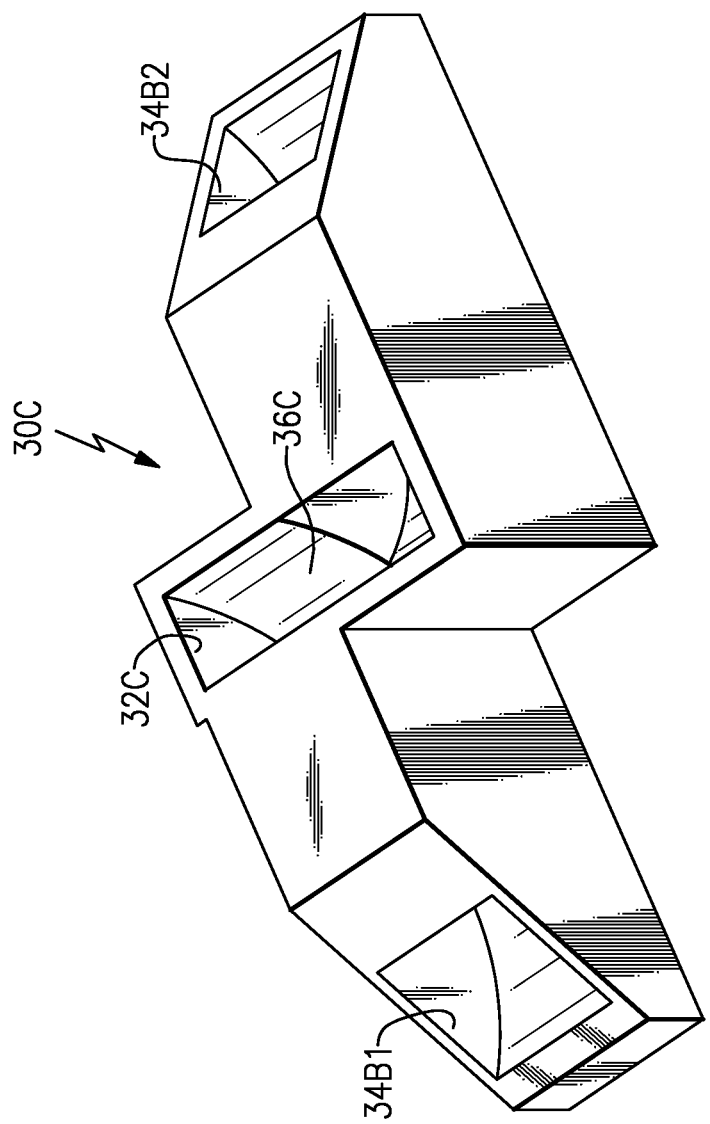
FIG. 6 is a perspective view of a deconsolidation device with one non-limiting embodiment of a flow control arrangement.

Referring to FIG. 6, another non-limiting embodiment of the flow path 36C of the coal deconsolidation device 30 provides a rectilinear inlet 32C as the first cross-section which is generally equivalent to the cross-section formed by the passageway 22, and a first and second outlet 34B1, 34B2 which each define the second cross-section. It should be understood that the first and second outlet 34B1, 34B2 may be of various forms such as those discussed above. The flow path 36C also turns through an at least ninety (90) degree turning angle.

Figure 7:
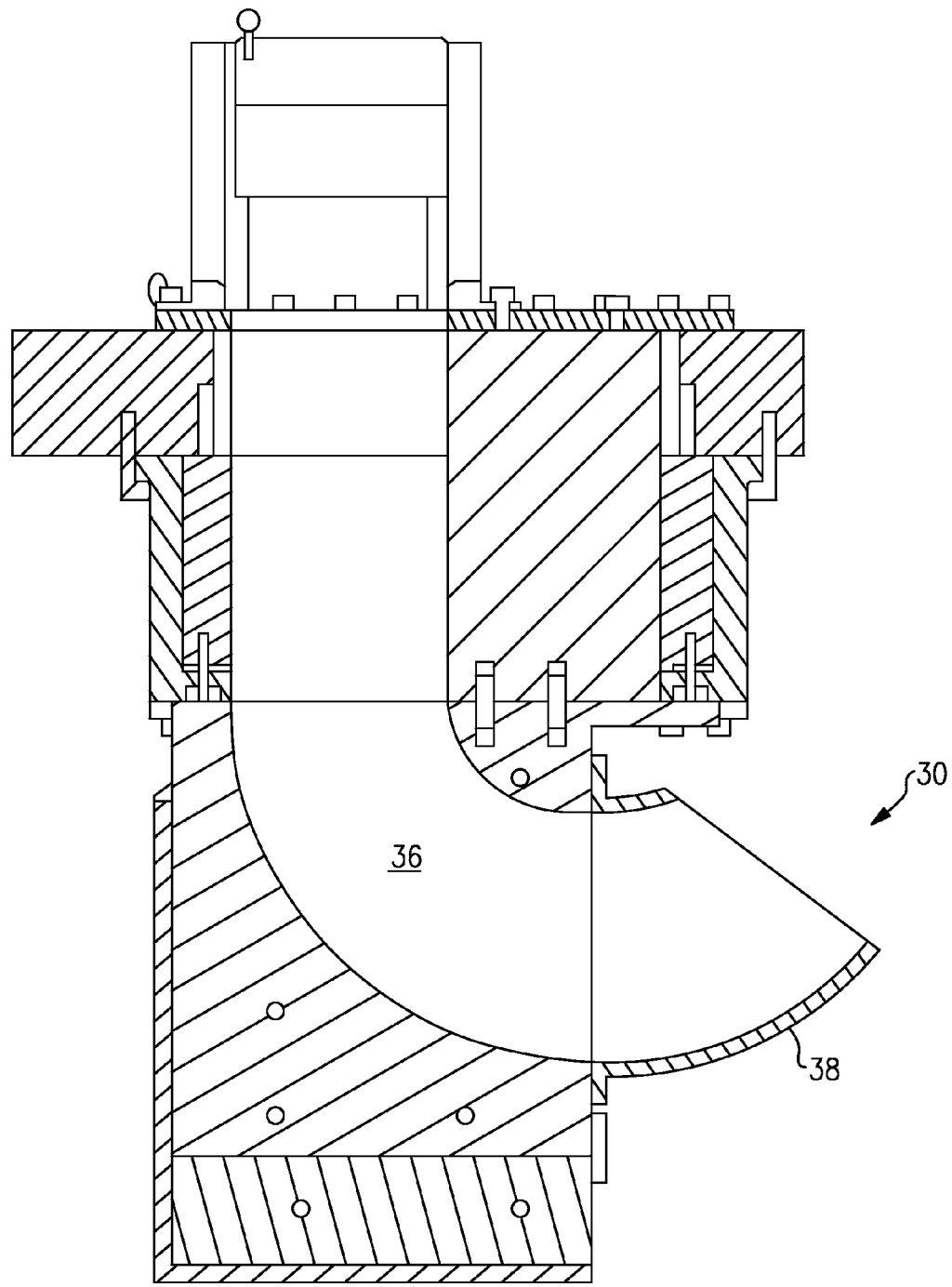
FIG. 7 is a sectional view of a deconsolidation device with one non-limiting embodiment of a flow control arrangement.

Referring to FIG. 7, the flow path 36 may additionally be arranged to assure the flow path 36 remains full as the pulverized carbon-based fuel moves through the coal deconsolidation device 30. In one non-limiting embodiment, the flow path 36 turns through a turning angle which may be greater than a ninety (90) degree turning angle through an extension 38. The turning angle may turn through an at least one hundred thirty five (135) degree turning angle which essentially defines a J-shape.

Figure 8:
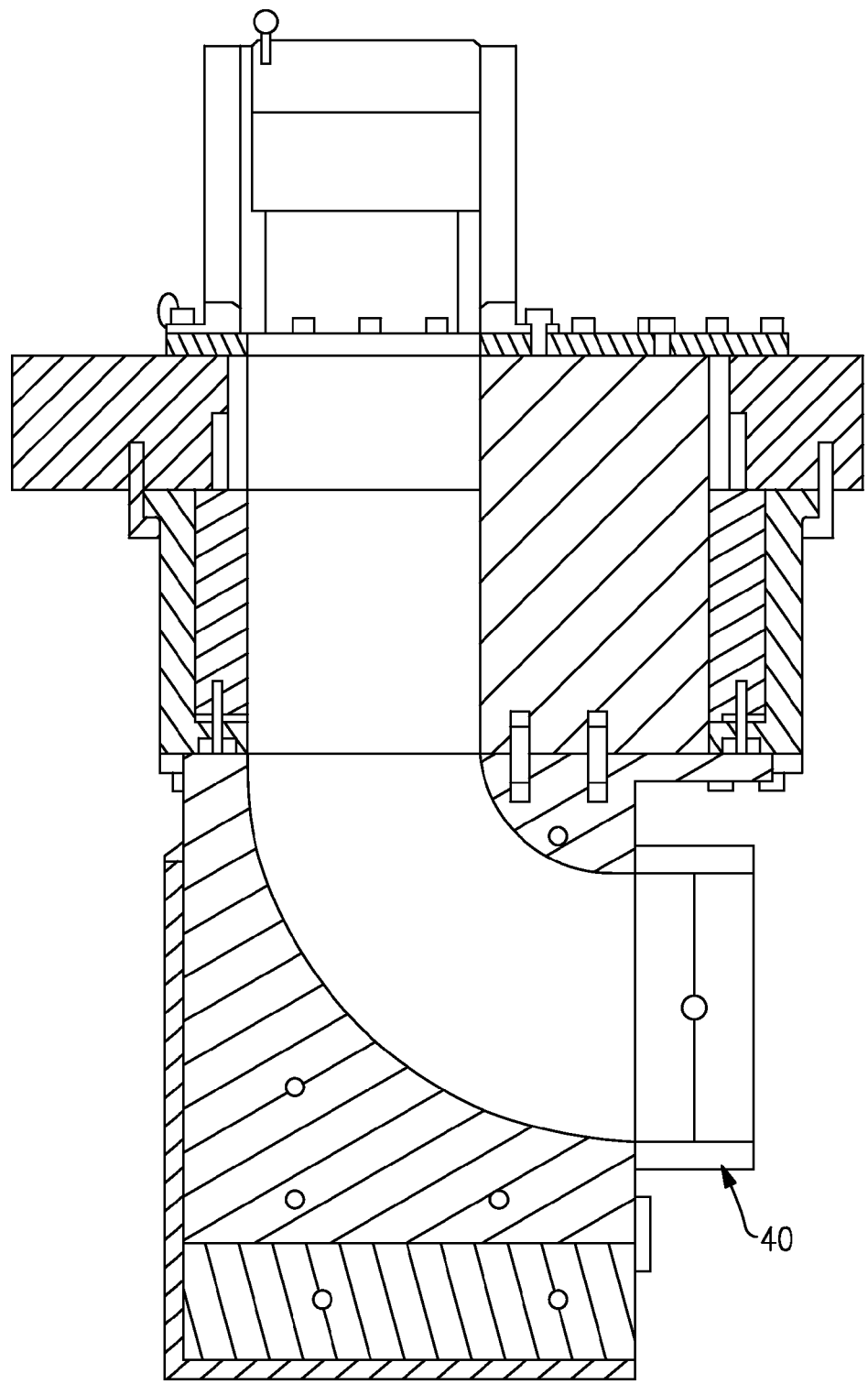
FIG. 8 is a sectional view of a deconsolidation device with another non-limiting embodiment of a flow control arrangement.

Referring to FIG. 8, another non-limiting embodiment includes a valve 40 (illustrated schematically) to assure the flow path 36 remains full as the pulverized carbon-based fuel moves through the coal deconsolidation device 30. The valve 40 may be a check-valve or other valve arrangement which requires a predetermined pressure for passage of the deconsolidated particulate material.

Figure 9:
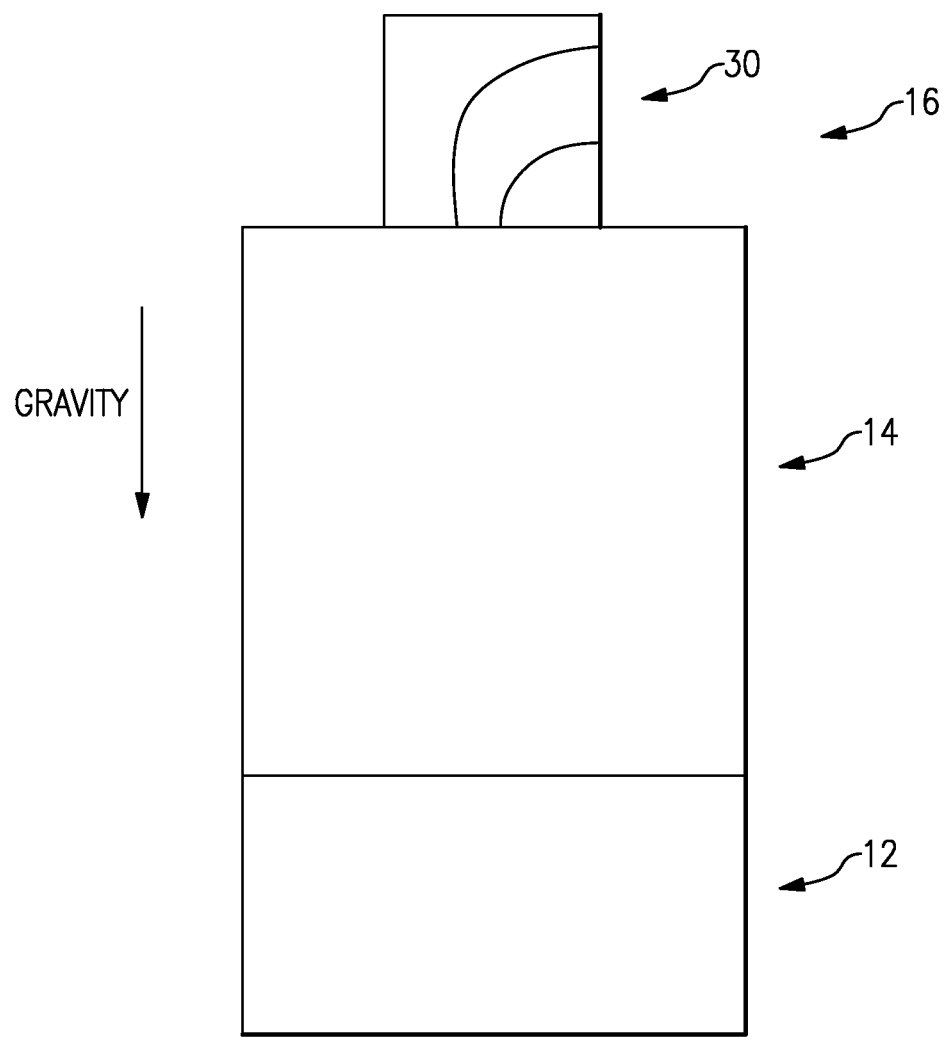
FIG. 9 is a sectional view of a deconsolidation device with another non-limiting embodiment of a flow control arrangement.

Referring to FIG. 9, another non-limiting embodiment arranges the dry coal linear tractor pump 10 such that the flow path 36 is arranged in a direction with regard to gravity to assure the flow path 36 remains full. That is, the coal deconsolidation device 30 may be located above the dry coal linear tractor pump 10 with respect to gravity such that the pulverized carbon-based fuel must move in opposition to gravity.

The coal deconsolidation device 30 allows the linear tractor pump 10 to operate without heretofore required breaker mills, ball end mills or other moving pulverization machines.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A particulate material extrusion pump, comprising
    a vertical passageway including a moving vertical wall, said passageway defines a passageway cross-section; and
    a deconsolidation device having a stationary non-linear flow path extending from an inlet connected to the vertical passageway to an outlet, said inlet defines a first cross-section generally equivalent to said passageway cross-section and said outlet defines an exit for deconsolidated particulate and has a second cross-section different than said first cross-section.

2. The particulate material extrusion pump as recited in claim 1, wherein a passageway outlet from said passageway is adjacent to said inlet.

3. The particulate material extrusion pump as recited in claim 1, wherein said flow path changes direction with respect to an angle of repose defined by the compressed particulate material.

4. The particulate material extrusion pump as recited in claim 1, wherein said flow path changes direction and increases volume from said inlet to said outlet.

5. The particulate material extrusion pump as recited in claim 1, wherein said flow path turns through a turning angle of approximately ninety (90) degrees.

6. The particulate material extrusion pump as recited in claim 1, wherein said flow path turns through a turning angle greater than a ninety (90) degrees.

7. The particulate material extrusion pump as recited in claim 1, wherein said second cross-section defines an area ratio of 1.4-1.7 relative to said first cross-section.

8. The particulate material extrusion pump as recited in claim 1, wherein said deconsolidation device is above said passageway with respect to gravity.

9. The particulate material extrusion pump as recited in claim 1, wherein said flow path defines a J-shape.

10. The particulate material extrusion pump as recited in claim 1, further comprising a valve within said flow path.

11. The particulate material extrusion pump as recited in claim 1, wherein said flow path splits from said inlet into a first outlet and a second outlet.

12. A process of deconsolidating a pulverized carbon-based fuel comprising:
    conveying compressed particulate along a passageway in a direction; and
changing from the direction of the compressed particulate to a non-linear flow path having an intrados and an extrados that extends between an inlet that communicates with the passageway and an outlet downstream from the inlet, and turning the compressed particulate through a turning angle provided between the inlet and outlet which defines an angle less than said angle of repose, wherein the direction is generally linear, wherein changing the direction occurs downstream of the passageway which includes a moving wall.

* * * * *